United States Patent
DeKleine et al.

(10) Patent No.: US 12,171,165 B1
(45) Date of Patent: Dec. 24, 2024

(54) CHESTNUT PICKING SYSTEM, A CONVEYOR ASSEMBLY FOR SEPARATING CHESTNUTS AND METHOD OF HARVESTING

(71) Applicants: Herbert Arthur DeKleine, San Luis Obispo, CA (US); Carl DeKleine, Grand Haven, MI (US)

(72) Inventors: Herbert Arthur DeKleine, San Luis Obispo, CA (US); Carl DeKleine, Grand Haven, MI (US)

(73) Assignees: Herbert Arthur DeKleine, San Luis Obispo, CA (US); Carl DeKleine, San Luis Obispo, CA (US)

( * ) Notice: Subject to any disclaimer, the term of this patent is extended or adjusted under 35 U.S.C. 154(b) by 0 days.

(21) Appl. No.: 18/613,955

(22) Filed: Mar. 22, 2024

(51) Int. Cl.
*A01D 51/00* (2006.01)
*A23N 5/00* (2006.01)

(52) U.S. Cl.
CPC ........... *A01D 51/002* (2013.01); *A23N 5/006* (2013.01)

(58) Field of Classification Search
CPC ................. A01D 51/002; A01D 29/00; A01D 46/00–46/30; A01D 33/00–33/14; A01D 17/00–17/22; A23N 5/00–5/08; B07B 1/00–1/62; B07B 1/14; B07B 1/15
See application file for complete search history.

(56) References Cited

U.S. PATENT DOCUMENTS

| | | | |
|---|---|---|---|
| 3,182,437 A | 5/1965 | Leslie | |
| 3,872,657 A | 3/1975 | Ramacher | |
| 3,962,072 A | 6/1976 | Ramacher | |
| 3,985,233 A * | 10/1976 | Sherman | A01G 23/02 |
| | | | 209/672 |

(Continued)

FOREIGN PATENT DOCUMENTS

| | | | | |
|---|---|---|---|---|
| IT | 1117613 B | * | 2/1986 | ........... A01D 46/285 |
| SU | 793459 A1 | * | 1/1987 | |

OTHER PUBLICATIONS

Ramacher JD48 images from https://auction-is-action.hibid.com/lot/83725-266858-10689/ramacher-jd48-self-propelled-nut-harvester, Jul. 23, 2024.

(Continued)

*Primary Examiner* — Thomas B Will
*Assistant Examiner* — Madeline I Runco
(74) *Attorney, Agent, or Firm* — The Watson IP Group, PLC; Jovan N. Jovanovic (57) ABSTRACT

A nut picking system suitable for picking chestnuts having a gathering assembly, and a conveyor assembly. The gathering assembly has an intake and a mesh belt associated with the intake. The gathering assembly gathers chestnuts and burrs through the intake to from the mesh belt at the dispensing axle. The conveyor assembly includes a frame, bed rollers and a conveyor drive. The frame has a conveyor sides, a feed and discharge end. Each bed roller has a first end and a second end and outer surface. The bed rollers are rotatably coupled to the frame, and are spaced apart from (Continued)

each. The bed rollers include a plurality of spaced apart fingers extending outwardly from the outer surface and terminating in a tip. The fingers have a length that is greater than the bed roller spacing. The conveyor drive rotates the bed rollers. Methods are likewise disclosed.

19 Claims, 9 Drawing Sheets

(56) References Cited

U.S. PATENT DOCUMENTS

| | | | | |
|---|---|---|---|---|
| 4,172,516 | A * | 10/1979 | Curl | B65G 47/66 |
| | | | | 198/848 |
| 6,253,535 | B1 * | 7/2001 | Paulson, Jr. | A23N 12/00 |
| | | | | 172/55 |
| 8,640,880 | B2 * | 2/2014 | Farwick | B07B 1/528 |
| | | | | 209/672 |
| 9,027,319 | B1 * | 5/2015 | Di Anna | A01D 51/002 |
| | | | | 56/328.1 |
| 2007/0066368 | A1 * | 3/2007 | Flora | A01D 51/002 |
| | | | | 460/79 |
| 2020/0253123 | A1 * | 8/2020 | DeMont | A01D 69/03 |

OTHER PUBLICATIONS

Weiss Mcnair 936 images from https://www.facebook.com/marketplace/item/1650446425126672/, Jul. 23, 2024.

Uline Cable Catalog with model Nos. from https://www.uline.com/BL_3209/Black-UV-Cable-Ties?pricode=WR668&AdKeyword=uv%20protected%20cable%20ties&AdMatchtype=p&gad_source=1, Jul. 23, 2024.

\* cited by examiner

CHESTNUT PICKING SYSTEM, A CONVEYOR ASSEMBLY FOR SEPARATING CHESTNUTS AND METHOD OF HARVESTING

BACKGROUND OF THE DISCLOSURE

1. Field of the Disclosure

The disclosure relates in general to a nut picking and harvesting, and more particularly, to a chestnut picking system which is capable of harvesting, extracting and/or separating chestnuts from chestnut burrs. It will be understood that the system is not limited to use in association with chestnuts, however, it has been shown that such a system is suitable for use in association with chestnut harvesting.

2. Background Art

The chestnut tree produces an edible nut which is harvested and popular for human consumption as well as various industrial purposes. Prior to human consumption or processing, the chestnuts must be extracted from their protective "burr" which covers the chestnuts as they grow, mature, and drop from the chestnut tree. After maturing and dropping from the tree, chestnut burrs will generally crack or open and allow the chestnuts contained within to be released, though it has historically been difficult to efficiently remove and separate the chestnuts from their protective burrs even after the nuts have matured and opened.

Prior methods of collecting and separating the chestnuts have included hand harvesting, rolling drums, screens, and air systems. It has historically been particularly difficult to separate the chestnuts from their protective burrs during the harvesting process itself, as opposed to separating the burrs subsequent to collection and harvesting. To add to the complexity of chestnut harvesting and processing, the protective burrs have a tendency to adhere to one another due to their spiny or thorny characteristics.

SUMMARY OF THE DISCLOSURE

In an aspect of the disclosure, the disclosure is directed to a nut picking system suitable for picking chestnuts. The system comprises a gathering assembly, and a conveyor assembly. The gathering assembly has an intake and a mesh belt associated with the intake. The mesh belt extends about at a dispensing axle. The gathering assembly is structurally configured to gather at least chestnuts and burrs one of having and not having chestnuts through the intake and dispensing the same from the mesh belt at the dispensing axle. The conveyor assembly includes a frame, a plurality of bed rollers and a conveyor drive. The frame has a first conveyor side and a second conveyor side. The conveyor sides defining a feed end and a discharge end, the feed end being positioned proximate the dispensing axle. Each bed roller has a first end and a second end, thereby defining an outer surface therebetween. The bed rollers are positioned between the first conveyor side and the second conveyor side and rotatably coupled to the frame. The plurality of bed rollers are spaced apart from each other a bed roller spacing. At least one of the plurality of bed rollers includes a plurality of spaced apart fingers extending outwardly from the outer surface thereof, the spaced apart fingers terminating in a tip and having a length that is greater than the bed roller spacing. The conveyor drive is structurally configured to rotate the bed rollers at a desired speed.

In some configurations, the mesh belt defines a mesh belt linear speed, and the plurality of fingers define a tip linear speed. The tip linear speed is at least 1.10 times that of the mesh belt linear speed. In some configurations, the tip linear speed is at least three times that of the mesh belt linear speed.

In some configurations, a plurality of the plurality of bed rollers each includes a plurality of spaced apart fingers extending outwardly from the outer surface thereof.

In some configurations, the fingers of adjacent bed rollers are staggered whereupon when rotated the fingers of adjacent bed rollers remain spaced apart from each other.

In some configurations, at least a plurality of the fingers has a length of at least 2.1 inches.

In some configurations, at least a plurality of the fingers has a width that is less than 0.5 inches.

In some configurations, at least a plurality of the fingers comprise zip ties.

In some configurations, a plurality of the fingers extend generally perpendicular to the outer surface of the bed roller.

In some configurations, the conveyor drive includes a drive gear that is coupled to the dispensing axle of the gathering apparatus, and further includes at least one chain coupling the drive gear each of the plurality of bed rollers.

In some configurations, the outer surface of a plurality of the plurality of bed rollers comprises a resilient material extending thereover.

In some configurations, the first conveyor side and the second conveyor side are pivotably coupled to the gathering assembly.

In some configurations, the first conveyor side and the second conveyor side can pivot at least to an orientation that is in a downward direction toward the discharge end of at least 10°.

In some configurations, the first conveyor side and the second conveyor side can pivot at least between an orientation that is horizontal and an orientation that is in a downward direction toward the discharge end of at least 10°.

In some configurations, the system further comprises a chestnut collector positioned below the plurality of bed rollers.

In some configurations, the frame includes an enclosure covering at least a plurality of bed rollers between the feed end and the discharge end thereof.

In another aspect of the disclosure, the disclosure is directed to a conveyor assembly for picking nuts, suitable for chestnuts. The conveyor assembly includes a frame that has a first conveyor side and a second conveyor side. The conveyor sides defining a feed end and a discharge end. Each bed roller has a first end and a second end, thereby defining an outer surface therebetween. The bed rollers are positioned between the first conveyor side and the second conveyor side and rotatably coupled to the frame. The plurality of bed rollers are spaced apart from each other a bed roller spacing. At least one of the plurality of bed rollers includes a plurality of spaced apart fingers extending outwardly from the outer surface thereof, the spaced apart fingers terminating in a tip and having a length that is greater than the bed roller spacing. The conveyor drive is structurally configured to rotate the bed rollers at a desired speed.

In some configurations, each of the plurality of bed rollers further includes a plurality of spaced apart fingers extending outwardly from the outer surface thereof.

In yet another aspect of the disclosure, the disclosure is directed to a method of harvesting nuts, suitable for chestnuts, the method comprising: providing a conveyor assembly, the conveyor assembly having a plurality of bed rollers extending between a first end a second end, each of the bed rollers including a plurality of fingers extending outwardly therefrom, and along the bed roller between the first and second end, the conveyor assembly defining a feed end and a discharge end; actuating the bed rollers to rotate, wherein a spacing between bed rollers is less than a length at least some of the plurality of fingers; dispensing nuts and burrs, some of which include nuts onto the fee end, with the bed rollers impacting the same with the bed rollers; impacting burrs with the fingers with sufficient speed to force burrs free of chestnuts to the discharge end; and allowing chestnuts to fall between adjacent bed rollers.

BRIEF DESCRIPTION OF THE DRAWINGS

The disclosure will now be described with reference to the drawings wherein.

DETAILED DESCRIPTION OF THE DISCLOSURE

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1:
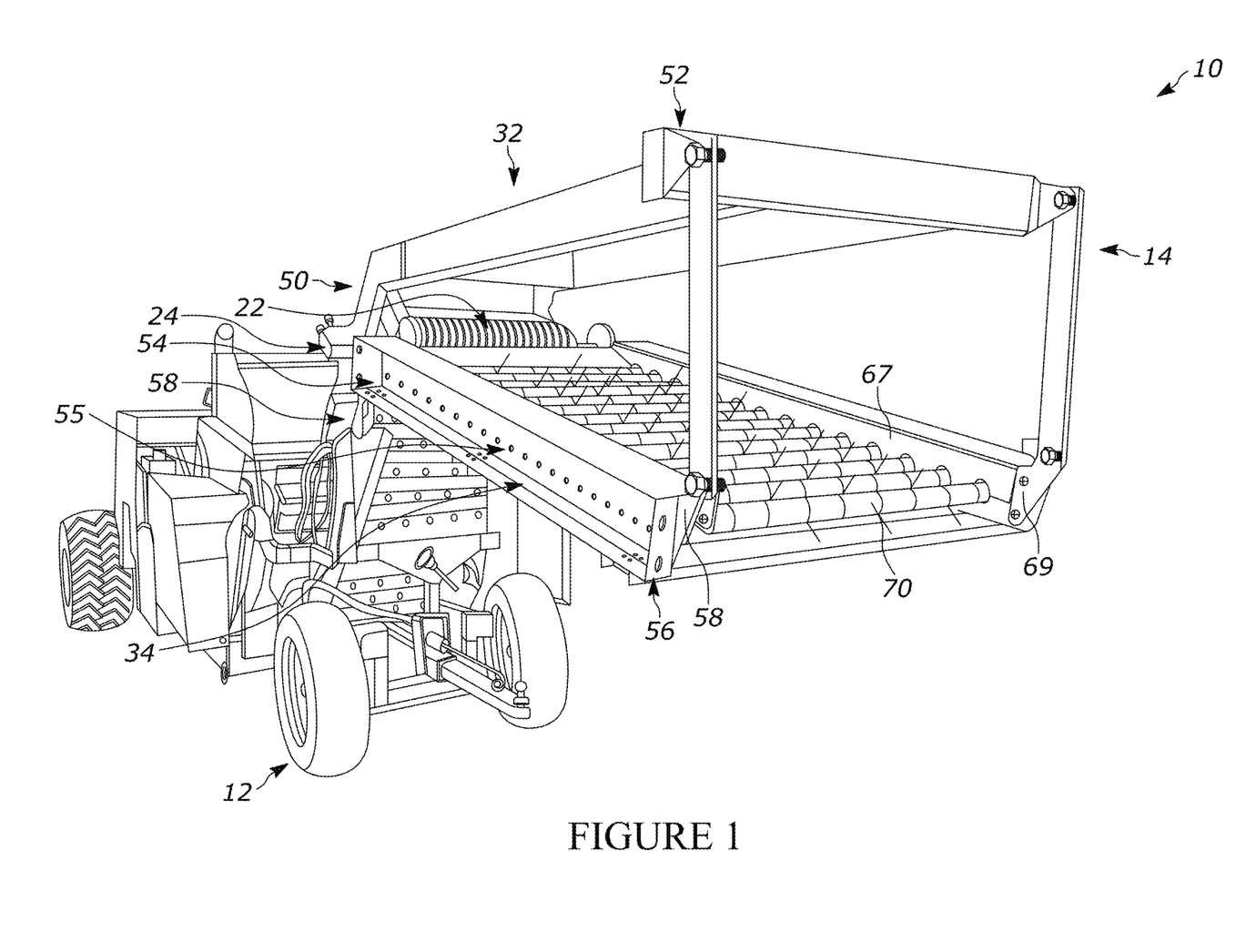
FIG. 1 of the drawings is a back perspective view of the chestnut picking apparatus of the present disclosure.
Figure 2:
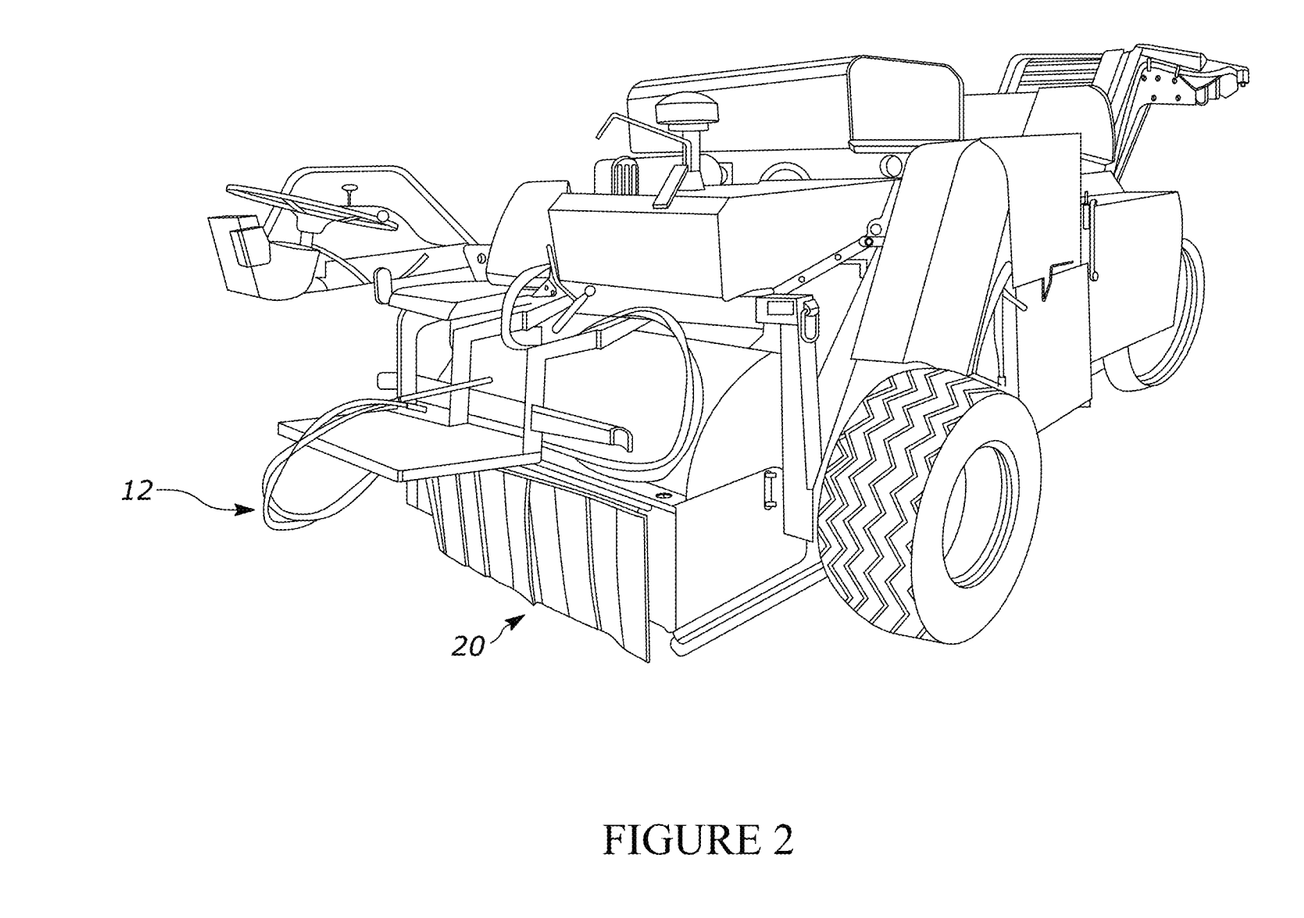
FIG. 2 of the drawings is a front perspective view of a typical gathering assembly prior to modification and attachment of the conveyor assembly thereto.
Figure 3:
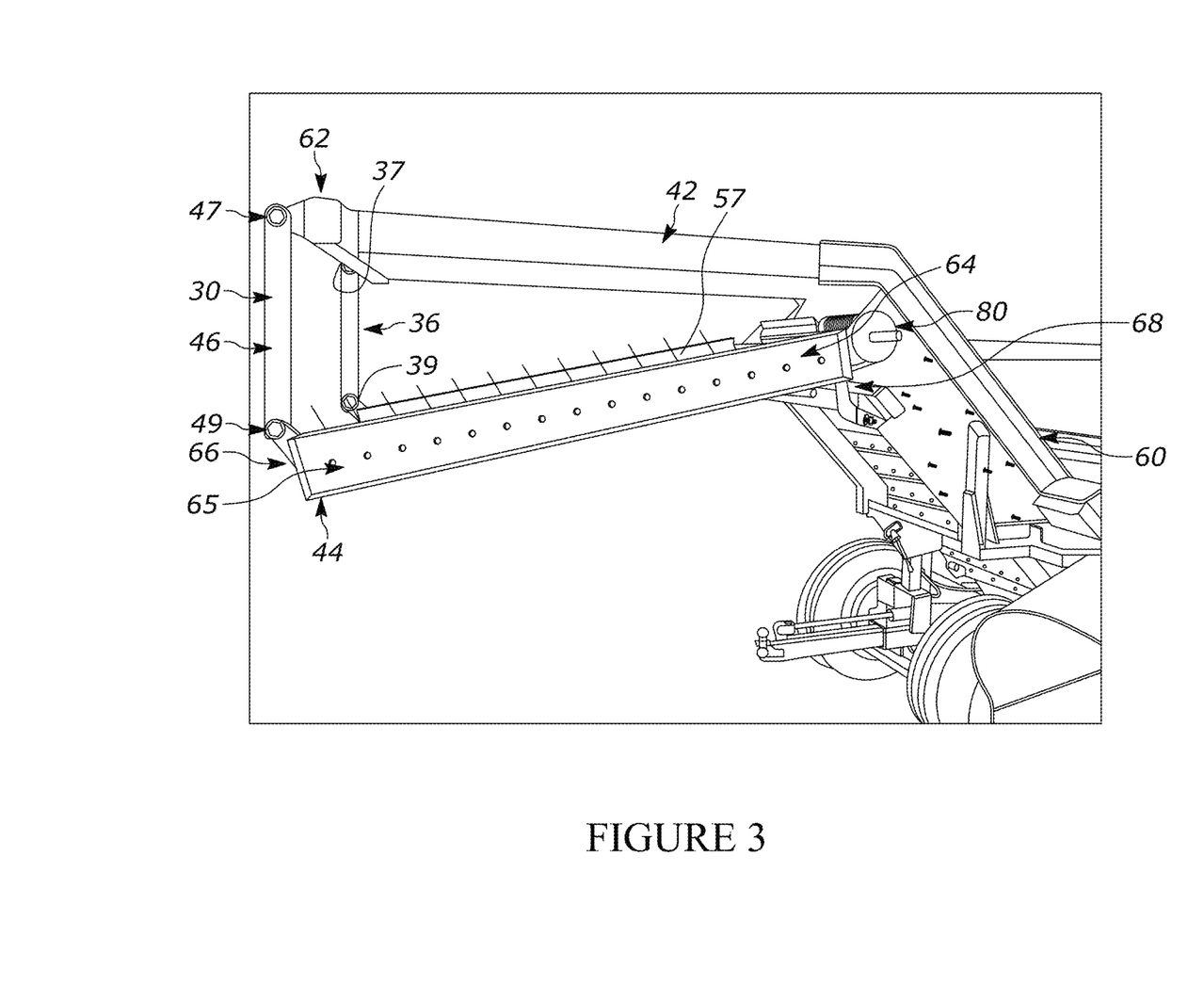
FIG. 3 of the drawings is a side elevational view of the chestnut picking apparatus of the present disclosure.
Figure 4:
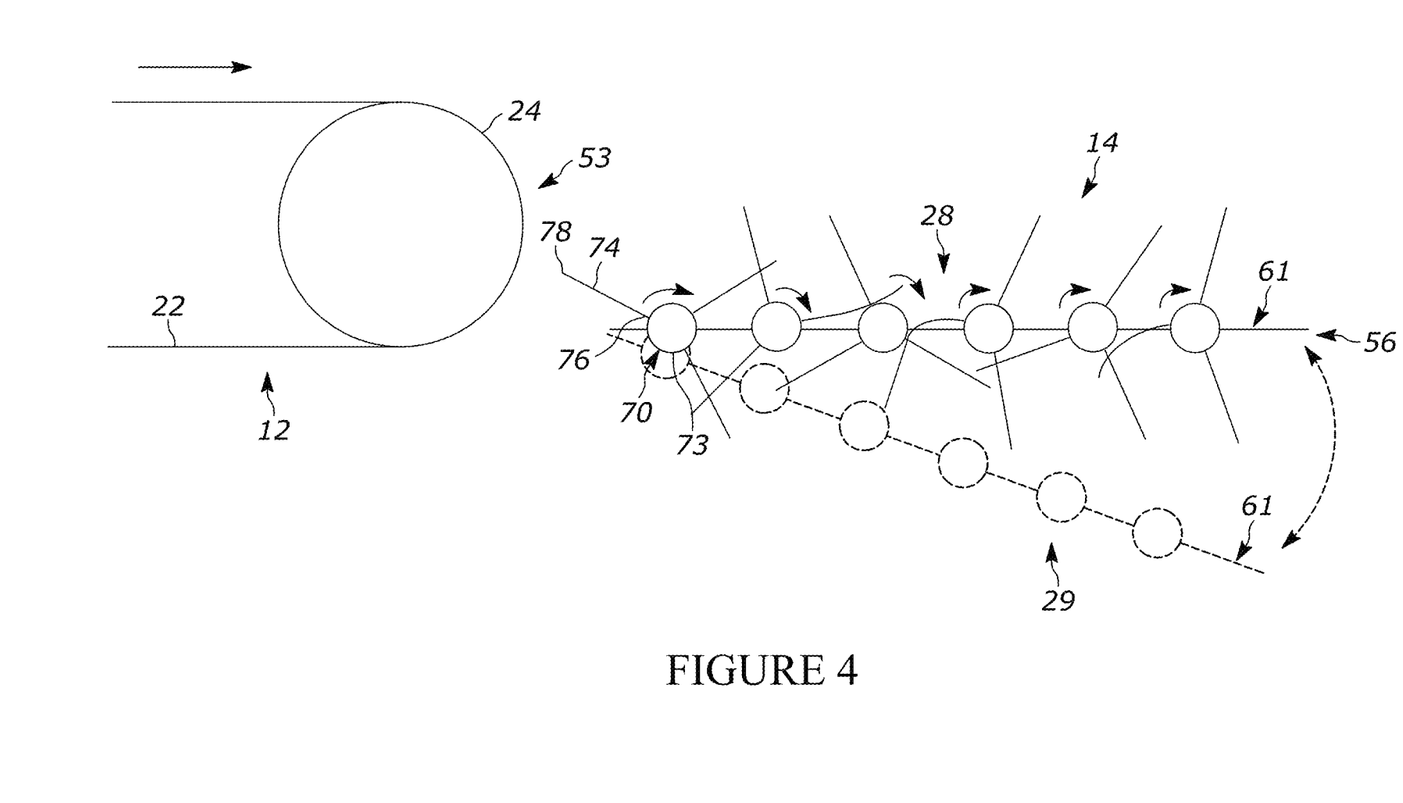
FIG. 4 of the drawings is a schematic representation of portions of the chestnut picking apparatus of the present disclosure, showing, in particular, the interaction of the adjacent bed rollers having fingers extending therefrom.

Referring now to the drawings and in particular to FIGS. 1 through 3, a configuration of a system for picking chestnuts is shown generally at 10. In the configuration shown, the system is shown as comprising gathering assembly 12, conveyor assembly 14 and chestnut collector 16 (FIG. 9). The apparatus is useful for the picking of chestnuts. As will be known to those skilled in chestnuts and harvesting of chestnuts, and with reference to FIG. 8, multiple chestnuts 200 are covered with a protective and spiny capsule, often referred to as "a protective burr" or, simply a "burr" 210. As the nuts are ready to be harvested, the capsule splits open, and the chestnuts can be separated from within the capsule. In some instances, it may be necessary to agitate the chestnut to achieve release of the chestnut from within a burr. The burrs tend to have a lower density than the nuts, however, due to the spiny outer structure, it is often the case that adjacent burrs can become interlocked and may require the application of force to separate.

In the configuration shown, the gathering assembly 12, in one configuration, may comprise a conventional walnut, almond, pecan and/or hazelnut harvester. With reference to FIGS. 1 through 3, one such harvester is a self-propelled Nut Harvester that was available from Ramacher, such as a JD48 harvester (Ramacher, now a part of Weiss McNair, of Chico, California), the entire specification of which is incorporated by reference herein. Such gathering assemblies are structurally configured to pick up nuts and the like from the ground, and then separate dirt, sticks and other debris, while placing other chestnuts (free and in burrs) onto a mesh belted belt, such as mesh belt 22, that is rotated about a distal dispensing axle, such as axle 24. While not required, in the configuration shown, the mesh belt is inclined in an upward direction, terminating at the distal dispensing axle. In the configuration shown, the mesh belt is inclined at an angle of approximately 30 to 60 degrees relative to the horizontal. Greater or lesser angles of inclination are contemplated. It is also contemplated that the conveyor may be substantially horizontal, such as the initial configuration of the above-described harvester of Ramacher (which was modified so as to alter the dispensing inclination of the mesh belt.

In some instances, rather than being self-propelled, the gathering assembly may be pulled by a tractor, truck, or other implement. It will be understood that the gathering assembly 12 is not limited to the foregoing particular harvester. Another harvester that can be utilized with present disclosure, with reference to FIG. 9, is a Weiss McNair model 936 harvester available from Weiss McNair, of Chico, California, the entire specification of which is incorporated by reference herein. For example, it will be understood that other harvesters from Weiss McNair are contemplated for use, including but not limited to a 7510 Harvester, the 9810 Harvester, among others. The harvesters of other manufacturers, including, but not limited to Flory, Exact, Savage, AMB Rousset, among others, can be adapted for use, and/or utilized.

Furthermore, other harvesters are contemplated for use, as long as such harvesters are capable of picking up and handling chestnuts that have fallen out of burrs, as well as burrs that include chestnuts. It will further be understood that the gathering assembly may comprise a manual and/or semi manual picking of chestnuts (free and contained within burrs) and associated debris, and the separation thereof through any number of methods.

Preferably, conveyor assembly 14 is mounted directly to the gathering assembly 12, and in an orientation wherein the discharge from the mesh belt is directed onto the conveyor assembly. In one configuration, the conveyor assembly includes frame, conveyor rollers, and a conveyor drive assembly. With reference to FIGS. 1, 3 and 4 through 7, the conveyor assembly 14 includes frame 30, bed rollers, such as bed roller 70 and conveyor drive 80.

Frame 30 includes first side support 32, second side support 42, first conveyor side 34, second conveyor side 44, first side adjuster link 36 and second side adjuster link 46. In the configuration shown, the first side support 32 is attached to a first side of the frame of the gathering assembly and extends outwardly beyond the mesh belt 22 and dispensing axle 24. The first side support 32 includes first end 50 and second end 52. In the configuration shown, the first side support is generally perpendicular to the dispensing axle 24. The second side support 42 is generally a mirror image of the first side support and includes first end 60 and second end 62. The first and second side supports are preferably spaced apart and generally parallel to each other. In the configuration shown, the first and second side supports have two legs which are oblique to each other, with the first leg following the inclination of the belt (i.e., the frame of the gathering assembly), with the second leg being generally horizontal relative to flat ground.

First conveyor side 34 is shown as including feed end 54, discharge end 56 and pivotable coupling 58. The first conveyor side 34 is pivotably mounted by way of pivotable coupling 58 to one of the first side support 32 or the first side of the gathering assembly, proximate the discharge axle. In the configuration shown, the first conveyor side can pivot between an angle of 0° and 60° and more preferably between 0° and 20°, and more preferably between 10° and 20°, relative to the ground, with the understanding that some picking locations may be anywhere from flat ground to very steep inclines or declines. In other configurations, the first conveyor side is fixed in a single angular relationship with the gathering assembly, and not pivotable. Preferably, the first conveyor side is generally linear defining a longitudinal axis therealong. In the configuration shown, an inner channel extends along the longitudinal axis. a plurality of spaced apart openings are defined on inner surface 57 (and in some configurations, outer surface 55) so as to facilitate the attachment to the bed rollers.

The second conveyor side 44 is shown as including feed end 64, discharge end 56 and pivotable coupling 68. The second side conveyor is a mirror image, preferably of the first side conveyor and is positioned in a spaced apart relationship therefrom so as to define a plane which is generally parallel to the dispensing axle of the gathering assembly 12. In particular, the second conveyor side 44 is pivotably mounted by way of pivotable coupling 68 to one of the second side support 42 or the second side of the gathering assembly, proximate the dispensing axle. In the configuration shown, the first conveyor side can pivot between an angle of 0° and 60° and more preferably between 0° and 20°, and more preferably between 10° and 20°, relative to the ground, with the understanding that some picking locations may be anywhere from flat ground to very steep inclines or declines. In other configurations, the second conveyor side is fixed in a single angular relationship with the gathering assembly, and not pivotable. Generally, the first and second sides will have the same ability to pivot, while not required. Preferably, the second conveyor side is generally linear defining a longitudinal axis therealong. In the configuration shown, an inner channel 69 extends along the longitudinal axis. a plurality of spaced apart openings are defined on inner surface 67 (and in some configurations, outer surface 65) so as to facilitate the attachment to the bed rollers.

First side adjuster link 36 is shown as including top 37 and bottom 39. The top 37 is attached toward, near or at the second end 52 of the first side support 32. The bottom 39 is attached to the first conveyor side spaced apart from the feed end of the first conveyor side, and in the configuration shown, the discharge end 56 of the first conveyor side. Similarly, second side adjuster link 46 is shown as including top 47 and bottom 49. The top 47 is attached toward, near or at the second end 62 of the second side support 42. The bottom 49 is attached to the second conveyor side spaced apart from the feed end of the second conveyor side, and in the configuration shown, the discharge end 66 of the second conveyor side. It will be understood that in some configurations the length of the first and second side adjuster links 36, 46 may be changed in length so as to alter the angle of the first and second conveyor sides 34, 44 relative to the gathering assembly. In some configurations, the adjustment may be indexed (spaced apart openings), whereas in others it may be more continuously adjustable (i.e., linear nut and screw coupling).

It is contemplated that a housing (not shown) may be positioned to extend between the first conveyor support 32 and the second conveyor support 42 between the feed end and the discharge ends thereof, so as to contain the chestnuts and burrs therebetween, forming an enclosure over the conveyor. In the configuration shown, wherein the first and second conveyor sides are positioned below the first and second side supports, walls may be constructed between the first side support and the first conveyor side, as well as between the second side support and the second conveyor side, with a ceiling being constructed between the first and second side supports. In a configuration wherein the frame has only the first and second conveyor sides, or wherein the first and second side supports are positioned below the first and second conveyor sides, a wall and ceiling structure can be constructed and attached to the gathering assembly or to the first and/or second conveyor sides.

Referring now to FIGS. 1, 3, 4 and 7, bed rollers, such as bed roller 70, are shown as being disposed between first conveyor side and second conveyor side (and being rotatably coupled thereto by having axles extending through the inner surfaces 57, 67, and in some cases outer surfaces 55, 65), so as to define an axis of rotation 79. Together, the bed rollers define a plane 61 the plane having a top side 28 and a bottom side 29.

Each of the bed rollers 70 have an operable portion that includes a first end 71 and a second end 72, with the axles extending outwardly therefrom and into the first and second conveyor sides. The portion of the bed roller that is between the inner surfaces of the first conveyor side and the second conveyor side defines outer surface 73. With the configuration of the first and second sides and the bed rollers, preferably, the bed rollers have a length that is greater or equal to the width of the mesh belt at the dispensing axle of the gathering assembly 12, while other dimensions are contemplated. Furthermore, while in the configuration shown, each of the plurality of bed rollers has a uniform roller length, it is contemplated that in some embodiments the roller lengths may vary between bed rollers.

In the configuration shown, the outer surface has a generally uniform circular cross-sectional configuration, thereby defining a generally cylindrical shape across the length of the operable portion, though the bed rollers are in not limited to such a configuration. The uniform circular cross-sectional configuration defines a roller diameter. In the configuration shown, while the bed roller is generally formed from a metal member, the outer surface of the roller may be coated with a resilient member so as to provide cushioning to the chestnuts and to prevent and/or minimize bruising of or other damage to the chestnuts. In some configurations, the outer surface may be lined with a foam material, a rubberized coating and/or a fabric sleeve, among other resilient materials. In the configuration shown, the bed rollers have a diameter of 2", while other diameters are contemplated.

Fingers, such as finger 74, are disposed along the length of at least a plurality of (and preferably each of) the bed rollers in a spaced apart orientation. Each of the plurality of fingers 74 include an attachment end 76 and tip 78, defining a length. In the configuration shown, the agitator comprises a flexible member that extends generally perpendicularly from the surface of the bed roller. In the configuration shown, the length of the fingers is 4" to 6" while longer fingers and/or shorter fingers are contemplated. Indeed, the length of each finger 74 may vary on a single bed roller, or may be varied among bed rollers, or may be uniform throughout the conveyor assembly. It is contemplated that the width of the fingers is substantially uniform (while variations such as variations along the length or at the tip are contemplated) and between 0.09" and 75", and more preferably between 0.14" and 0.5", and more preferably between 0.14" and 0.30". For example, it is contemplated that zip ties, such as those sold by U-Line of Pleasant Prairie, Wisconsin under the Natural cable ties, or the Black UV cable ties, including but not limited to mode numbers S-12396, S-5832, S-14039, S-7743, S-12407, among other models are contemplated. The foregoing models are incorporated by reference, and are meant to be exemplary and not to be limiting.

As such, the finger has a width that is substantially smaller than the diameter of a chestnut and the diameter of a burr.

With reference to FIGS. 4 through 7, in the configuration shown, a single finger extends from the bed roller at various predetermined intervals (such as a spacing of between 2" and 12", and more preferably between 4" and 8", while other intervals are contemplated). It is further contemplated that at any given interval a plurality of fingers may extend (i.e., the fingers may define a plane that is generally perpendicular to the axis of rotation 79 of the bed roller). Additionally, attachment ends 76 may be aligned so as to define a line parallel to the axis of rotation, or the attachment ends may be staggered.

In the configuration shown, the fingers comprise conventional zip-ties of the desired length and width. The zip ties are extended around the bed roller at the desired location and fastened thereto, so that the end beyond the locking head defines the finger length. In other configurations, the fingers may comprise structures wherein the attachment end is adhered or fastened to the outer surface through adhesive or mechanical fasteners. For example, the fingers may include tabs that interlock with slots on the outer surface of the bed roller. In other configurations, openings may extend through the outer surface of the bed roller to which the fingers may be attached.

The bed rollers are installed and attached to the first conveyor side and the second conveyor side in a spaced apart relationship. In the configuration shown, the spacing between the bed rollers is 4" on center, such that with a diameter of 2" for the bed rollers, the space (i.e., bed roller spacing) between adjacent bed rollers is approximately 2". In such a configuration, the fingers are about 4" long such that the fingers of adjacent bed rollers will hit adjacent bed rollers as the bed rollers are rotated. Due to the resilience of the fingers, the fingers will bend to traverse across an adjacent bed roller, and then tend to return to an initial unobstructed configuration (which will tend to be generally straight, or slightly curved). Additionally, the fingers of adjacent bed rollers are preferably offset so that the fingers of a bed roller do not hit or otherwise interact with the fingers of an adjacent bed roller. In some configurations, the fingers of a first bed roller bisect the distance between fingers of an adjacent bed roller. In some configurations, the fingers of first bed roller correspond to the fingers of a bed roller on an opposite side of an adjacent bed roller. In still other configurations, the fingers of each of the bed rollers may be offset from each of the other fingers of the bed rollers of the conveyor assembly. Furthermore, in some configurations each of the plurality of fingers 74 may have the same finger length, or a different finger length.

Figure 5:
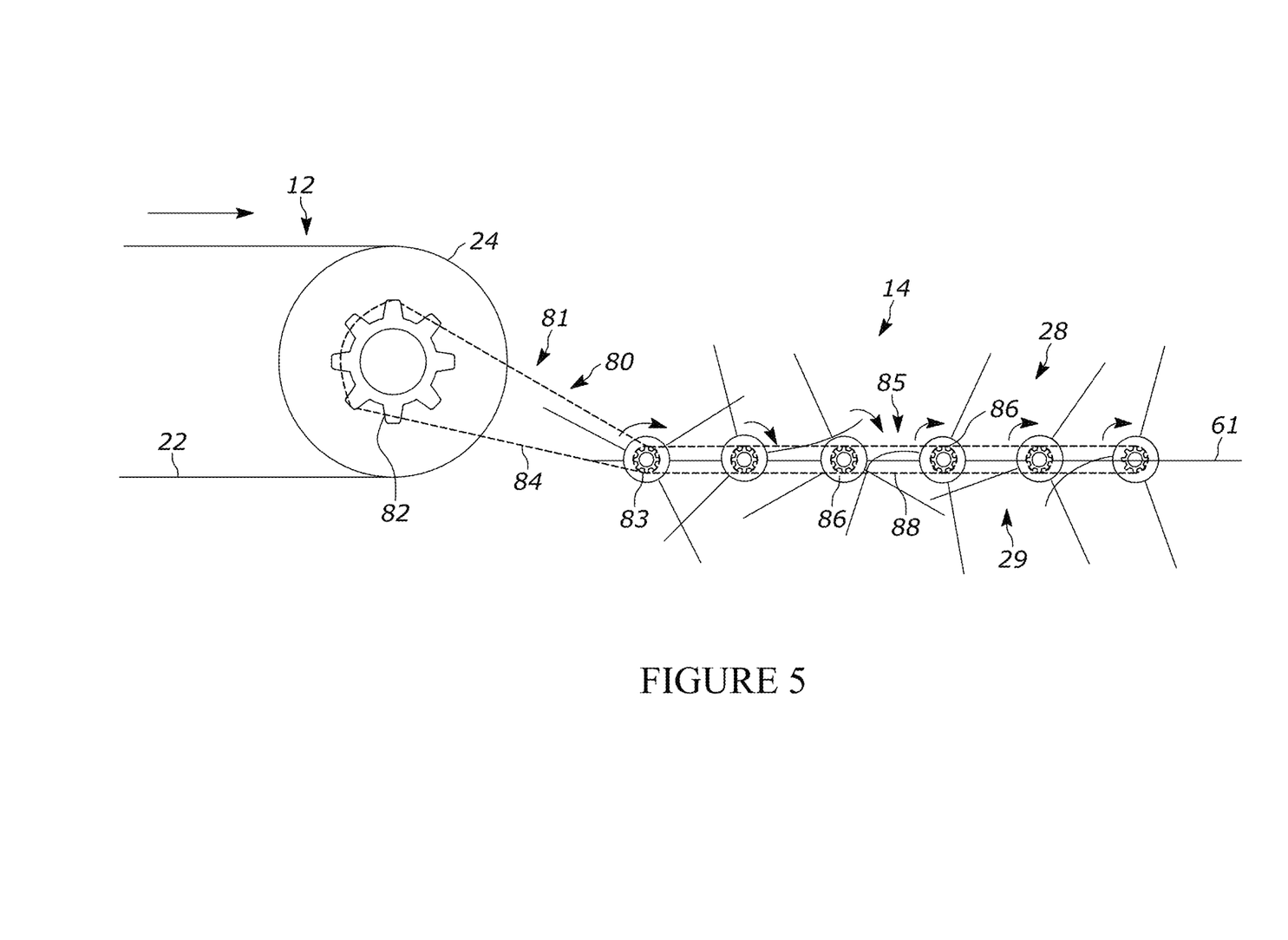
FIG. 5 of the drawings is a schematic representation of portions of the chestnut picking apparatus of the present disclosure, showing, in particular, the conveyor drive.

The conveyor drive 80 is shown in FIG. 5 as comprising initial drive 81 which includes initial drive gear 82, initial conveyor gear 83 and chain 84. The initial drive gear 82 is fixed to the dispensing axle 24 so as to be driven by the gathering assembly. The initial conveyor gear 83 is coupled to the initial bed roller, and positioned, preferably within the inner channel 59 of the first conveyor side. Chain 84 extends between the initial drive gear 82 and the initial conveyor gear 83 so as to couple the to gears together. It will be understood that as the mesh belt is driven, the dispensing axle 24 is powered, thereby rotating the initial drive gear 82. A plurality of secondary drives 85 are disposed between adjacent bed rollers. Each bed roller includes at least one secondary bed roller gear 86. A secondary chain 88 is used to couple adjacent bed rollers. Thus, the bed roller closest to the dispensing axle 24 is attached with a secondary chain to the adjacent bed roller, and so on to the final bed roller at the discharge end of the conveyor sides. Thus, each bed roller is powered by the adjacent bed roller toward the feed end, with the initial bed roller being powered by the gear on the dispensing axle. In the configuration shown, it is contemplated that each of the bed rollers rotate at the same speed, preferably. In other configurations, the speed of the rollers may change (by altering the sprocket associated with any one of the bed rollers).

Of course, other conveyor drives are contemplated for use. For example, the conveyor drives may be fully self powered, that is, they are powered separate from the gathering assembly. In one configuration, a separate electric motor can be used to drive the initial drive gear 82, while the remaining drive train remains substantially identical. In other configurations, belts and pulleys may be utilized in place of the gears and chains. In still other configurations, multiple motors can be utilized to achieve independent control of each of the bed rollers, or combinations of bed rollers. In still other configurations, the use of hydraulic motors and actuators is contemplated.

With reference to FIG. 9, the chestnut collector 16 is positioned below the bed rollers so as to capture chestnuts that fall between the bed rollers. In the configuration shown, the chestnut collector comprises a pallet bin 90. The pallet bin may be supported or attached to the gathering assembly or to the conveyor assembly so that the chestnut bin travels with the overall system. In other configurations, larger or smaller bins are contemplated for use. Additionally, further bins can be utilized to capture burrs and other debris that is collected by the gathering assembly and or that passes beyond the discharge end of the conveyor assembly. Depending on the configuration, a pre treatment or post treatment may be undertaken using air and/or water to remove or eliminate extraneous material that may otherwise reach or has reached the bin.

Figure 8:
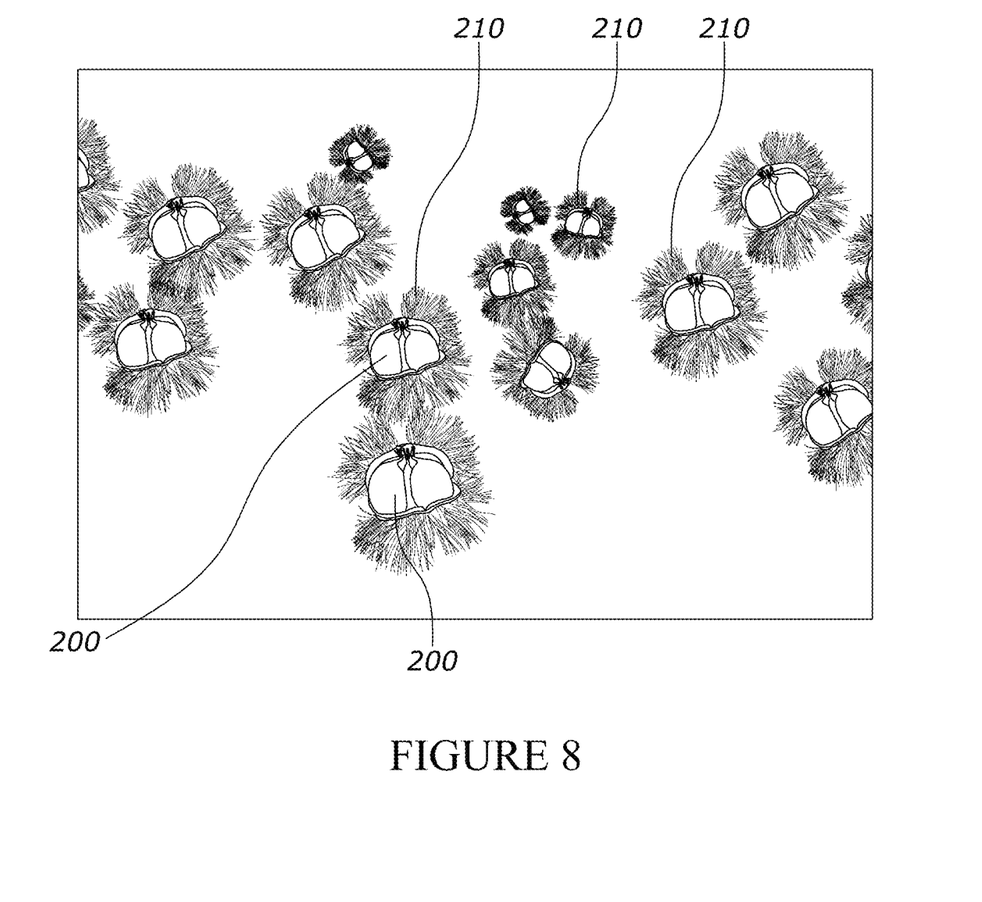
FIG. 8 of the drawings is a representation of chestnuts and burrs, with some chestnuts within burrs on the ground.
Figure 9:
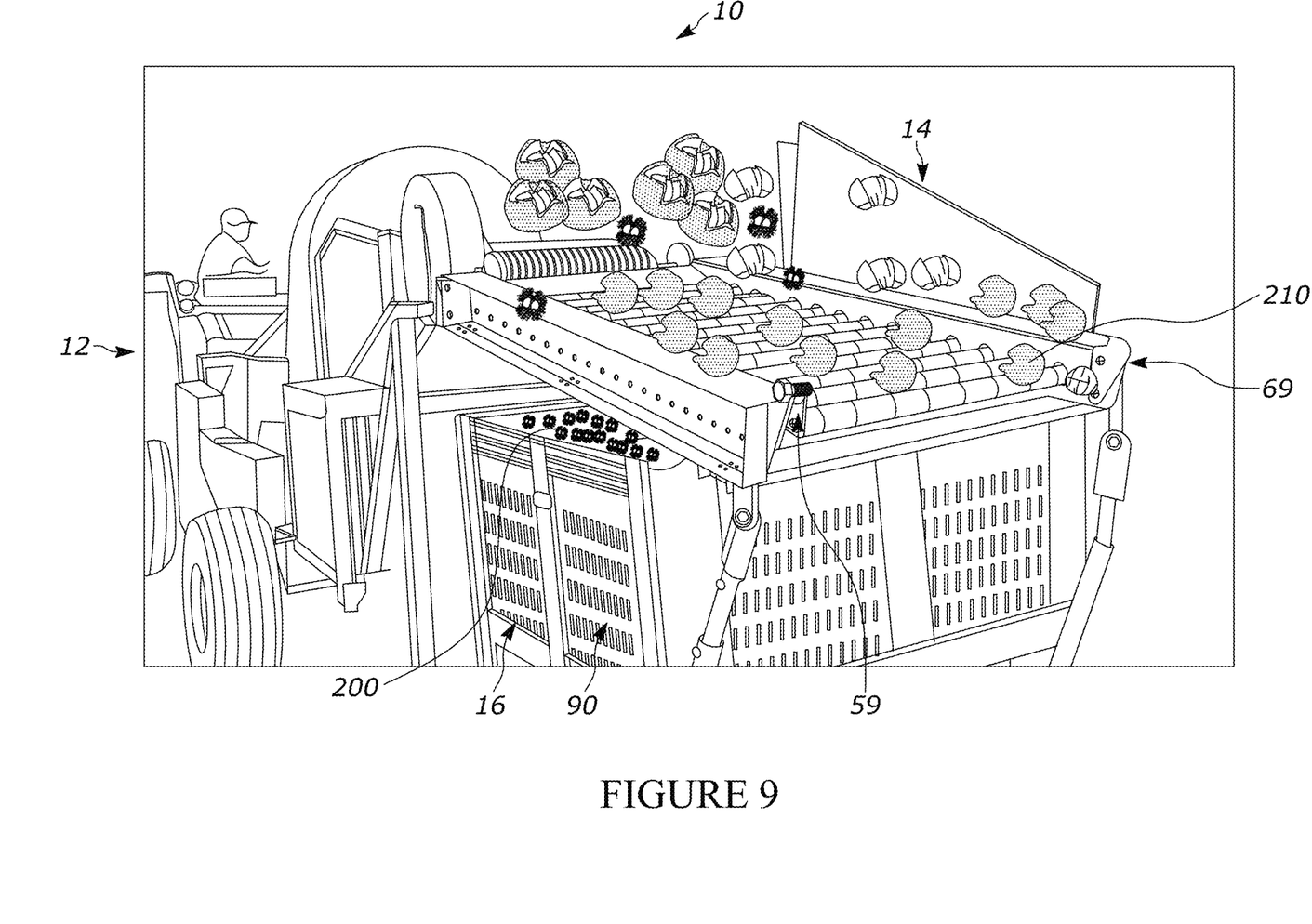
FIG. 9 of the drawings is a perspective view of a configuration of the chestnut picking apparatus in operation, with a chestnut collector positioned below the conveyor assembly, and wherein the conveyor portions and the adjuster links support the first conveyor side and the second conveyor side, as well as the bed rollers from below.

To use the system, typically, chestnuts (both free and within capsules) are strewn about the ground (and have fallen from trees, either naturally or through agitation), as is shown in FIG. 8. Generally, sweepers and the like can be used to initially gather these (along with sticks, leaves, branches, dirt and other debris) into piles that appear to be like elongated mounds. In other configurations, no initial gathering may be employed. Broadly, the gathering assembly structurally configured to gather at least chestnuts and burrs one of having and not having chestnuts through the intake and dispensing the same from the mesh belt at the dispensing axle.

In greater detail, the gathering assembly 12 is actuated so that the gathering system can scoop, vacuum, and/or otherwise pick up these piles from the ground through the intake 20 so as to process them. As the gathering assembly is operating, the mesh belt 22 is rotated. Through the internal operation of the gathering assembly, typically, virtually everything other than chestnuts, capsules/burrs typically one or both of having and not having chestnuts will tend to reach the end of the belt and the dispensing axle.

In the configuration shown and described herein, the chestnuts and burrs are fed directly from the mesh belt 22 to the feed end of the conveyors and onto the bed rollers 70. As described above, the rotation of the dispensing axle 24 drives (indirectly or directly) the plurality of bed rollers 70 to rotate along their respective longitudinal axis of rotation. In the configuration shown, the dispensing axle rotates at about 85 rpm, and with a 6" sprocket diameter of the dispensing axle, the linear speed of the mesh belt is approximately 133 ft/min. Of course, variations are contemplated, and these are to be exemplary, not limiting, and to show the relative difference in speed of various different components of the system.

Figure 6:
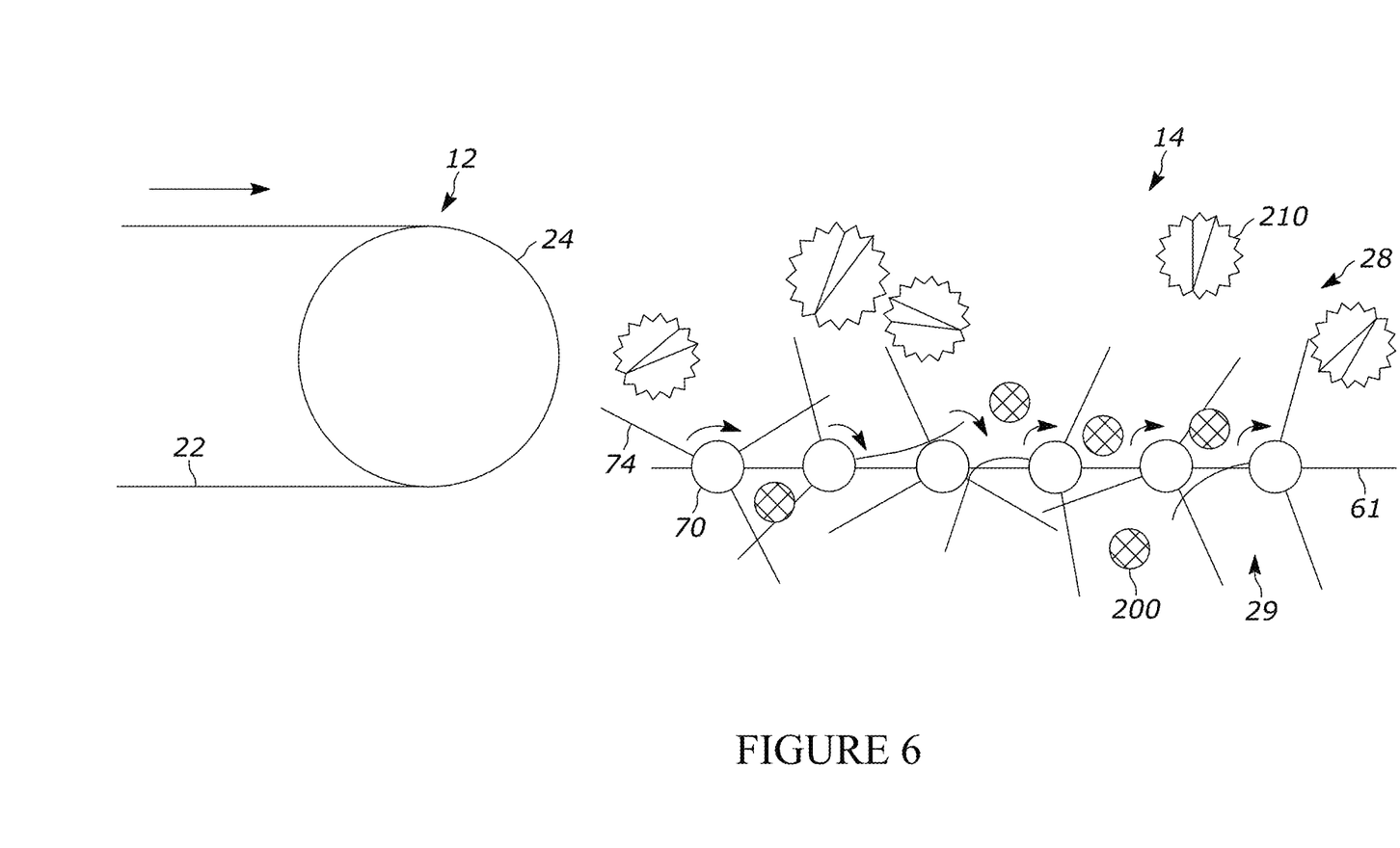
FIG. 6 of the drawings is a schematic representation of portions of the chestnut picking apparatus of the present disclosure, showing, in particular, the operation thereof, and the typical path of burrs and chestnuts within the system.
Figure 7:
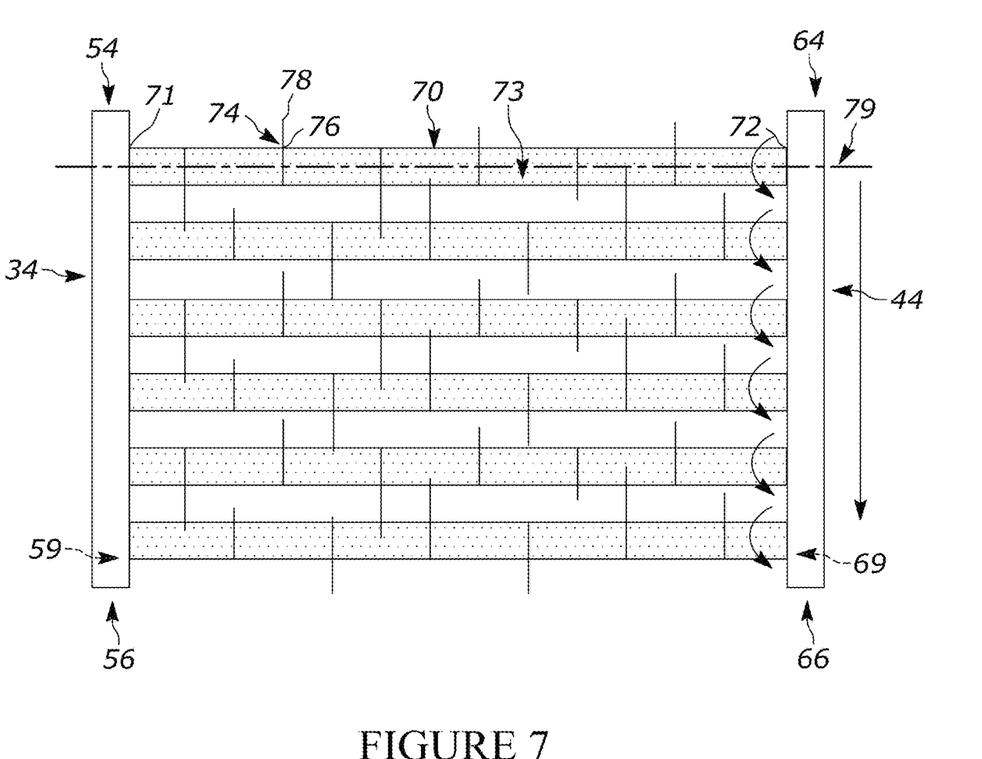
FIG. 7 of the drawings is a schematic representation of the conveyor assembly of the chestnut picking apparatus of the present disclosure.

With further reference to FIG. 6 and FIG. 9, as the plurality of bed rollers rotate, the plurality of fingers 74 extending from the outer surfaces of the bed rollers rotate in unison, bending each time that they reach an adjacent bed roller, and then elastically returning to an initial unobstructed configuration. It is contemplated through the sizing of the gears of the conveyor drive, and the diameters of the bed rollers, it is contemplated that the bed rollers will rotate at approximately 180 rpm. With the dimensions of the bed roller at 2" and the length of the fingers being 4", the linear speed of the bed roller surface is approximately 94 ft/min, whereas the linear speed of the tip of the fingers is approximately 471 ft/min when the fingers are in straight and in the initially unobstructed configuration (it will be understood that as or if the fingers deform, and, have a shorter effective length, the linear speed of the tip will be reduced. Thus, the linear velocity of the tip is greater than the linear speed of the mesh belt, and in the configuration shown, over 3.5 times faster. It is contemplated that the linear speed of the tips of the fingers are anywhere between 1.10 and 8 times faster than the linear speed of the mesh belt.

Therefore, as the chestnuts and burrs (some having chestnuts, and some not having chestnuts) traverse from the feed end to the discharge end of the conveyor assembly, they may be impacted by the outer surfaced of the bed roller or the fingers along the length thereof. Typically, chestnuts are substantially heavier than empty burrs and have outer dimensions (i.e., diameter, while not perfect spheres) that are generally smaller than 2". On the other hand, burrs tend to be larger than 2" even when broken open, and tend to have a volume which is roughly 7 times larger than that of a chestnut (at a substantially smaller density). Thus, the movement along the conveyor is such that the agitation dislodges the chestnuts and the chestnuts (being too heavy to be dramatically pushed by the fingers) through the force of gravity, fall between the bed rollers and into the chestnut collector. At the same time, the lighter and larger burrs (now empty) are impacted by the fingers (which have tips that have a linear velocity substantially greater than that of the outer surface of the bed roller and the initial speed from the gathering apparatus). The velocity of the fingers, and their flexibility, yet resilience, pushes the lighter burrs so that they to continue move down along adjacent bed rollers and fall off the discharge end of the conveyor assembly, in what can appear to be a tumbling motion, flying, impacting and/or flicking motion, while their size generally precludes the burrs from falling through between the adjacent bed rollers due. As set forth above, the chestnuts, on the other hand, are generally smaller than 2 inches in diameter and tend to be heavy enough so that they are not strongly affected by the fingers (i.e., the fingers will tend to bend and flex as they impact the heavier chestnuts) are thus capable of falling by the force of gravity through the spaces between the bed rollers, into the chestnut collection 16 which is positioned below the conveyor in the form of a bin.

It will be understood that numerous variations are contemplated. For example, the dimensions can be altered of the spacing between bed rollers, along with the dimension and spacing of the fingers so as to allow the desired nut to fall between the bed rollers, while the fingers can impart sufficient force to push the burrs to the discharge end often with added velocity. Due to the weight of the nuts and the size/mass of the fingers (along with the velocity thereof), the fingers do not impart much change in movement to the nuts, allowing the nuts instead to be affected overwhelmingly by gravity (wherein they will either bounce or impact the outer surface of the bed roller, or fall between adjacent bed rollers). The difference in the weight and the densities allows the fingers to affect the burrs to a much greater extent than the chestnuts. The speeds may be altered or adjusted to achieve desired results.

Another contemplated variation is to have a frame that omits the first and second side supports, with the first and second conveyor sides being of sufficient strength so as to be directly coupled to the gathering assembly. In still other configurations, such as the configuration of FIG. 9, the first and second side supports may support the first conveyor side and the second conveyor side from below, with the first and second side adjuster links raising and lowering the discharge end from below, where adjustment is desired.

Further modifications are contemplated, such as the decoupling from the gathering assembly. For example, in some configurations, the conveyor assembly with an independent conveyor drive, and chestnut collector may be stationary (with a movable chestnut collector, for example), wherein loads of chestnuts and burrs can be delivered to the stationary machine for processing by the conveyor assembly. In still other configurations, the gathering assembly and the conveyor assembly may be movable, but unlinked to each other (in two separate pieces of equipment that can be coupled together, or that remain spaced apart. In some such configurations, the conveyor assembly and the gathering assembly may be located relative to each other, yet remain decoupled from each other, or connected indirectly.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A nut picking system comprising, suitable for picking chestnuts, the system comprising:
   a gathering assembly having an intake, a mesh belt associated with the intake the mesh belt extending about at a dispensing axle, the gathering assembly structurally configured to gather at least chestnuts and burrs one of having and not having chestnuts through the intake and dispensing the same from the mesh belt at the dispensing axle;
- a conveyor assembly, the conveyor assembly including:
  - a frame having a first conveyor side and a second conveyor side, the conveyor sides defining a feed end and a discharge end, the feed end being positioned proximate the dispensing axle;
  - a plurality of bed rollers, each bed roller having a first end and a second end, thereby defining an outer surface therebetween, the bed rollers positioned between the first conveyor side and the second conveyor side and rotatably coupled to the frame, the plurality of bed rollers being spaced apart from each other at a bed roller spacing, wherein at least one of the plurality of bed rollers includes a plurality of spaced apart fingers extending outwardly from the outer surface thereof, the spaced apart fingers terminating in a tip and having a length that is greater than the bed roller spacing; and
  - a conveyor drive structurally configured to rotate the bed rollers at a desired speed.

2. The chestnut picking system of claim 1 wherein the mesh belt defines a mesh belt linear speed, and the plurality of fingers define a tip linear speed, the tip linear speed being at least 1.10 times that of the mesh belt linear speed.

3. The chestnut picking system of claim 1 wherein the tip linear speed is at least three times that of the mesh belt linear speed.

4. The chestnut picking system of claim 1 wherein a plurality of the plurality of bed rollers each includes a plurality of spaced apart fingers extending outwardly from the outer surface thereof.

5. The chestnut picking system of claim 1 wherein the fingers of adjacent bed rollers are staggered whereupon when rotated the fingers of adjacent bed rollers remain spaced apart from each other.

6. The chestnut picking system of claim 1 wherein at least a plurality of the fingers has a length of at least 2.1 inches.

7. The chestnut picking system of claim 6 wherein at least a plurality of the fingers has a width that is less than 0.5 inches.

8. The chestnut picking system of claim 1 wherein at least a plurality of the fingers comprise zip ties.

9. The chestnut picking system of claim 1 wherein a plurality of the fingers extend generally perpendicular to the outer surface of the bed roller.

10. The chestnut picking system of claim 1 wherein the conveyor drive includes a drive gear that is coupled to the dispensing axle of the gathering apparatus, and further includes at least one chain coupling the drive gear each of the plurality of bed rollers.

11. The chestnut picking system of claim 1 wherein the outer surface of a plurality of the plurality of bed rollers comprises a resilient material extending thereover.

12. The chestnut picking system of claim 1 wherein the first conveyor side and the second conveyor side are pivotably coupled to the gathering assembly.

13. The chestnut picking system of claim 12 wherein the first conveyor side and the second conveyor side can pivot at least to an orientation that is in a downward direction toward the discharge end of at least 10°.

14. The chestnut picking system of claim 13 wherein the first conveyor side and the second conveyor side can pivot at least between an orientation that is horizontal and an orientation that is in a downward direction toward the discharge end of at least 10°.

15. The chestnut picking system of claim 1 further comprising a chestnut collector positioned below the plurality of bed rollers.

16. The chestnut picking system of claim 1 wherein the frame includes an enclosure covering at least a plurality of the plurality of bed rollers between the feed end and the discharge end thereof.

17. A conveyor assembly for picking nuts, suitable for chestnuts, the conveyor assembly comprising:
- a frame having a first conveyor side and a second conveyor side, the conveyor sides defining a feed end and a discharge end;
- a plurality of bed rollers, each bed roller having a first end and a second end, thereby defining an outer surface therebetween, the bed rollers positioned between the first conveyor side and the second conveyor side and rotatably coupled to the frame, the plurality of bed rollers being spaced apart from each other at a bed roller spacing, wherein at least one of the plurality of bed rollers includes a plurality of spaced apart fingers extending outwardly from the outer surface thereof, the spaced apart fingers terminating in a tip and having a length that is greater than the bed roller spacing; and
- a conveyor drive structurally configured to rotate the bed rollers at a desired speed.

18. The conveyor assembly of claim 17 wherein each of the plurality of bed rollers further includes a plurality of spaced apart fingers extending outwardly from the outer surface thereof.

19. A method of harvesting nuts, suitable for chestnuts, the method comprising:
- providing a conveyor assembly, the conveyor assembly having a plurality of bed rollers extending between a first end a second end, each of the bed rollers including a plurality of fingers extending outwardly therefrom, and along the bed roller between the first and second end, the conveyor assembly defining a feed end and a discharge end;
- actuating the bed rollers to rotate, wherein a spacing between bed rollers is less than a length at least some of the plurality of fingers;
- dispensing nuts and burrs, some of which include nuts onto the feed end, with the bed rollers impacting the same with the bed rollers;
- impacting burrs with the fingers with sufficient speed to force burrs free of chestnuts to the discharge end; and
- allowing chestnuts to fall between adjacent bed rollers.

\* \* \* \* \*